UNITED STATES PATENT OFFICE 2,389,576

ESTERS OF DIOLEFINIC PHOSPHONIC ACIDS

Gennady M. Kosolapoff, Dayton, Ohio, assignor to Monsanto Chemical Company, a corporation of Delaware No Drawing. Application August 16, 1943, Serial No. 498,865

9 Claims. (Cl. 260—461)

This invention relates to new phosphorus-containing compounds, particularly to new acids and esters of aliphatic, diolefinic phosphonic acids and polymers thereof, and to methods of producing the same.

An object of the present invention is the preparation of new phosphorus-containing, polymerizable compounds. Another object of the invention is the preparation of new, stable, phosphorus-containing polymers. Still another object of the invention is the provision of vulcanizable, fire-resistant synthetic rubbers. Other objects will be hereinafter disclosed.

These objects are accomplished by the present invention wherein aliphatic, diolefinic phosphonic acids having the two following structures:

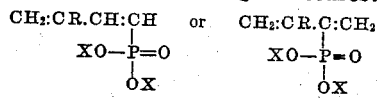

wherein R is a member of the group consisting of hydrogen and methyl and X is H or an alkyl group of from 1 to 5 carbon atoms are prepared by reaction of a quantity, in excess of molar proportions, of an aliphatic diolefin such as isoprene or butadiene with phosphorus pentachloride to yield a chlor alkene tetrachloride which is readily hydrolyzed to the corresponding chlor alkene phosphonic acid. Esterification of the tetrachloride with an aliphatic alcohol of from 1 to 5 carbon atoms and dehydrohalogenation of the resulting diester results in good yields of the following compounds: dimethyl 1,3-butadiene-1-phosphonate, dimethyl 1,3-butadiene-2-phosphonate, diethyl 1,3-butadiene-1-phosphonate, diethyl 1,3-butadiene-2-phosphonate, di-n-propyl 1,3-butadiene-1-phosphonate, di-n-propyl 1,3-butadiene-2-phosphonate, di-isopropyl 1,3-butadiene-1-phosphonate, di-isopropyl 1,3-butadiene-2-phosphonate, dibutyl 1,3-butadiene-1-phosphonate, dibutyl 1,3-butadiene-2-phosphonate, di-isobutyl 1,3-butadiene-1-phosphonate, di-isobutyl 1,3-butadiene-2-phosphonate, diamyl 1,3-butadiene-1-phosphonate, diamyl 1,3-butadiene-2-phosphonate, di-isoamyl 1,3-butadiene-1-phosphonate, di-isoamyl 1,3-butadiene-2-phosphonate.

Starting with isoprene, the following compounds may be prepared by the herein described methods:

Dimethyl isoprene-3-phosphonate, dimethyl isoprene-4-phosphonate, diethyl isoprene-3-phosphonate, diethyl isoprene-4-phosphonate, di-n-propyl isoprene-3-phosphonate, di-n-propyl isoprene-4-phosphonate, di-isopropyl isoprene-3-phosphonate, di-isopropyl isoprene-4-phosphonate, di-n-butyl isoprene-3-phosphonate, di-n-butyl isoprene-4-phosphonate, di-isobutyl isoprene-3-phosphonate, di-isobutyl isoprene-4-phosphonate, diamyl isoprene-3-phosphonate, diamyl isoprene-4-phosphonate, di-isoamyl isoprene-3-phosphonate, di-isoamyl isoprene-4-phosphonate.

The above diesters of diolefinic phosphonic acids are oily to viscous liquids which readily polymerize to yield heavy oils or rubbery solids, depending upon the polymerizing conditions employed.

The diesters of 1,3-butadiene-1-phosphonic acid or of isoprene-4-phosphonic acid may be readily prepared by reaction of a quantity in excess of molar proportions, of either 1,4-dichloro-2-butene or 1,4-dichloroisoprene with a trialkyl phosphite or a sodium dialkyl phosphite, and dehydrohalogenation of the product. For example, diethyl 1,3-butadiene-1-phosphonate may be prepared substantially according to the reactions:

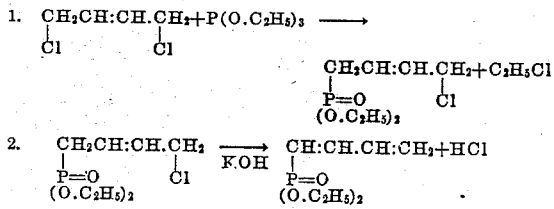

Instead of triethyl phosphite as shown in the above equations, there may be employed an alkali metal alkyl phosphite such as sodium diethyl phosphite or potassium diethyl phosphite, the reaction in this case occurring with cleavage of alkali metal chloride instead of ethyl chloride. As may be apparent to those skilled in the art, various trialkyl phosphites or alkali metal dialkyl phosphites where the alkyl group contains 1 to 5 carbon atoms may be used to obtain the corresponding dialkyl diolefinic phosphonates. For example, there may be employed tri-n-butyl phosphite or sodium di-n-butyl phosphite for the production of di-n-butyl 1,3-butadiene-1-phosphonate, tri-isopropyl phosphite or potassium di-isopropyl phosphite for the production of di-isopropyl 1,3-butadiene-1-phosphonate, etc.

A very valuable method for the production of mixtures of diolefinic 1-phosphonates and diolefinic 2-phosphonates is by reaction of an aliphatic diolefin with phosphorus pentachloride to yield the tetrachlorides, which upon esterification with an aliphatic alcohol of from 1 to 5 carbon atoms followed by dehydrohalogenation of the resulting mixture of diesters give a mixture of diolefinic 1- phosphonates and diolefinic 2-phosphonates. For example, a mixture of di-n-butyl 1,3-butadiene-1-phosphonate and di-n-butyl 1,3-butadiene-2-phosphonate is readily obtainable according to the following series of reactions:

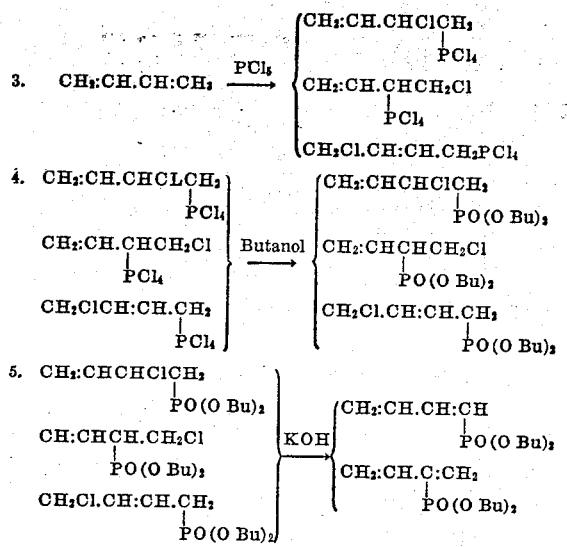

In the above series of reactions, Reaction 3 illustrates the addition of PCl₅ to the diolefin to produce three chlor alkene phosphorus tetrachlorides. Reaction 4 in which butanol is employed as the esterifying alcohol yields the corresponding chlor alkene diesters. Of course, other aliphatic alcohols of 1 to 5 carbon atoms may be similarly employed.

Reaction 5 illustrates the dehydrohalogenation of the chlor alkene diester to the dibutyl butadiene phosphonate. The reaction is illustrated with KOH, however, other alkalies such as NaOH or alkaline carbonates such as alkali metal and alkaline earth carbonates may be employed. Reactions 4 and 5 may be carried out simultaneously by employing an alkaline solution of the appropriate alcohol, as the esterifying and dehydrochlorinating reagent. Since it has been found that for many applications the mixture of diolefinic-1-phosphonates and the diolefinic-2-phosphonates serve as well as does the individual isomers, alone, there is usually no necessity for isolating the individual constituents of the isomeric mixture. Valuable rubber-like polymers are obtained by polymerization of such mixtures, or the individual components and the mixtures or components may also be advantageously employed for the preparation of other materials for use in the arts, for example, fire-proofing agents, surface-active agents, etc.

Polymerization of the diolefinic phosphonates is readily effected in mass at increased temperatures, say at temperatures of from 50° C. to 120° C. in presence or absence of catalysts of polymerization. As catalysts may be employed organic or inorganic oxygen-cleaving substances such as benzoyl peroxide, acetyl peroxide, ammonium persulfate, hydrogen peroxide, etc. Polymerization may also be effected by irradiation of the monomer, for example, by exposure of the monomer to the rays of a General Electric Sunlamp or to ultra-violet light. Depending upon the polymerization conditions employed, the polymeric products range from viscous liquids to porous, elastic solids.

Polymerization of the present monomeric diolefinic phosphonates may be likewise effected by polymerization in a liquid media which is a solvent for the monomeric phosphonate and a non-solvent for the polymer.

The present polymers are soluble in the commonly employed organic solvents. The unsaturation of the polymers permits vulcanization of the same, and the hard, rubbery materials which are obtained upon vulcanization are distinguished by insolubility in the common organic solvents, for example, benzene, carbon tetrachloride, gasoline, acetone, etc., and by a high degree of heat-stability and fire-resistance. When held in an open flame, the vulcanized polymeric diolefinic phosphonates do not ignite, the only visible change which they undergo being a slight swelling and distortion.

The monomeric diolefinic phosphonates may also be advantageously employed as intermediates in the preparation of a large number of materials of industrial interest, for example, fire-proofing agents, surface-active agents, insecticides, etc. Thus, chlorination of the diolefinic phosphonates yields tetrachlorobutanephosphonates or tetrachloro-2-methylbutanephosphonates which may be advantageously employed for impregnating textiles or other fibrous products for the purpose of flame-proofing the same.

The invention is further illustrated, but not limited, by the following examples:

EXAMPLE 1

*Preparation and polymerization of a mixture of diethyl 1,3-butadiene-1-phosphonate and diethyl 1,3-butadiene-2-phosphonate*

Into a cooled and stirred suspension of 208 grams (1 mol) of phosphorus pentachloride in 800 cc. of benzene, 100 cc. of liquid butadiene (1.16 mols) was distilled during a period of 2 hours. Stirring with ice-cooling was continued for 3 hours, and the reaction vessel was then packed in ice and allowed to stand for 2 days. At the end of this time, with ice-cooling and stirring, 200 grams of dry ethanol was added to the creamy mass and the resulting mixture was heated for 20 minutes to gentle reflux and cooled. Upon filtering off the small amount of insoluble matter which was present, the product was concentrated in vacuo to 296 grams of a yellow liquid. Chlorine analysis of this solution showed the presence of approximately 1 mol of labile chlorine in the total product (0.9779 gram gave 0.4785 gram AgCl), and indicated the formation of a chloro alkene phosphonic acid. This was treated with ice-cooling and stirring with a solution of 56 grams of potassium hydroxide in 500 cc. of dry ethanol, the mixture was stirred for 1 hour, centrifuged and the clear solution thus obtained distilled in vacuo. The greater part of the material boiled at a temperature of 100° C. to 124° C. at a pressure of 11 mm. of mercury, the following fractions boiling within this range being collected:

| Fraction | $n_D^{25}$ | B. p. °C./11 mm. | Per cent P |
|---|---|---|---|
| 1 | 1.4187 | 100 –105 | 15.70 |
| 2 | 1.4233 | 105.5–110 | 15.90 |
| 3 | 1.4320 | 111 –115 | 15.43 |
| 4 | 1.4400 | 117.5–124 | 16.32 |

All of the above fractions are initially colorless liquids which turn somewhat yellow upon standing. Their high degree of unsaturation is evidenced by the fact that they reduce permanganate solutions instantly in the cold. The phosphorus content of these fractions corresponds within the limits of experimental error to the theoretical phosphorus content of diethyl butadienephosphonate, i. e., 16.31%. Accordingly, the above fractions represent mixtures of the diethyl esters of 1,3-butadiene-1-phosphonic acid and 1,3-butadiene-2-phosphonic acid.

Polymerization of each of the above fractions was effected as follows: 5 gram samples of each fraction were treated with 2% by weight of benzoyl peroxide and heated in stoppered test tubes at 85° C. for a period of 3 weeks. At the end of this time fractions 1 and 2 were viscous liquids and the fractions 3 and 4 were semi-solids. When each of the polymerized fractions was dissolved separately in benzene and then precipitated with hexane, somewhat viscous gums were obtained in all cases. When these gums were heated with sulfur at a temperature of from 130° C. to 150° C. they were converted to hard, grey masses which were similar to hard rubber. These products were non-combustible and insoluble in benzene, acetone, carbon tetrachloride, or gasoline.

EXAMPLE 2

*Preparation and polymerization of a mixture of dibutyl isoprene-3-phosphonate and dibutyl isoprene-4-phosphonate*

50 cc. of isoprene was slowly added to a cooled, stirred suspension of 104 grams of phosphorus pentachloride in 400 cc. of benzene during a period of approximately 2½ hours. The resulting mixture was allowed to stand overnight and then 250 cc. of dry butanol was added to it dropwise. The clear, yellow solution which formed was heated briefly to reflux, cooled, poured on ice, and the organic layer separated. The latter was added slowly to a warm, 10% aqueous solution of sodium hydroxide, shaken thoroughly, and the organic layer was taken up, washed with water and distilled in vacuo. There was thus obtained a fraction, B. P. 165° C. to 180° C. at 18 mm. which upon redistillation gave 35 grams of the substantially pure, oily mixture of dibutyl isoprene-3-phosphonate and dibutyl isoprene-4-phosphonate, B. P. 170° C. to 172° C. at a pressure of 15 mm. of mercury. The molecular weight of the product was found to be 268 as against 260, the calculated molecular weight of dibutyl isoprenephosphonate and the refractive index of the mixture of phosphonates obtained was $n_D^{25}$ 1.4510.

The mixture of dibutyl isoprenephosphonates obtained as described above is more stable and is not as readily polymerized as is the mixture of diethyl butadienephosphonates of Example 1. The present mixture of dibutyl phosphonates may be employed for the production of highly chlorinated alkane phosphonates by introduction of chlorine by addition of the two olefinic double bonds and the chlorinated products advantageously used for the flame-proofing of textiles and other fibrous products.

EXAMPLE 3

Triethyl phosphite (32 g.) was mixed with 32 grams (an excess) of 1,4-dichloro-2-butene and heated to 130°–140° C. in an apparatus which was fitted with a device for collecting the ethyl chloride evolved during the reaction. Very rapid evolution of the ethyl chloride was essentially complete in 4 hours. At the end of this time the reaction mixture was treated, with ice-cooling, with 13 grams of potassium hydroxide in absolute alcohol, refluxed briefly, cooled and filtered. On distillation in vacuo there was obtained, after removal of the solvent and initial over-all distillation, the substantially pure diethyl 1,3-butadiene-1-phosphonate, B. P. 124° C.–138° C. at 16 mm. The ester reduces permanganate solution and gives a negative Beilstein test for chlorine.

When diethyl 1,3-butadiene-1-phosphonate is heated for 24 hours at a temperature of 85° C. it polymerizes to a gel. Heating the ester at a temperature of 120° C. without a catalyst under a reflux condenser for 6 days resulted in the production of brown, somewhat thermoplastic, though soft and rubber-like, solid. When the gel which was obtained by the catalyzed polymerization of ester was dissolved in benzene and then precipitated with hexane there was secured a plastic, putty-like substance. Heating of the latter with 25% of its weight of sulfur at 200° C. converted it into a thermoplastic, yellowish solid of considerable toughness.

EXAMPLE 4

1,4-dichlorobutene-2 (0.2 mol) was added to a hexane-alcohol solution of 0.2 mol of sodium diethyl phosphite and refluxed for 2 hours, after which the sodium chloride was centrifuged off and the solution was treated with 0.4 mol of sodium hydroxide in absolute ethyl alcohol and refluxed for 4 hours. Upon evaporating the solution to dryness there was obtained a viscous, water-soluble solid a low-molecular weight polymer of diethyl 1,3-butadiene-1-phosphonate.

Polymerization of the monomeric dialkyl olefinic phosphonates herein described, or mixtures of the same, may be prevented by incorporating therein materials which have a stabilizing or antioxidant nature, for example, hydroquinone, tert-amylaminophenol, copper powder or cuprous salts of organic carboxylic acids, etc. In the presence of such inhibitors the present diolefinic phosphonates may be reacted with chlorine for the preparation of polychlorinated alkane phosphonates.

Thus by addition chlorination there may be prepared the following:

Tetrachlorobutane or tetrachloromethylbutane-4-phosphonic acid and the esters of 1 to 5 carbon atom alcohols thereof, having the structure:

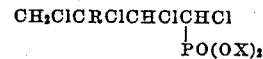

and tetrachlorobutane or tetrachloromethylbutane-3-phosphonic acid and the like esters having the structure

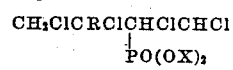

where in each case "X" means H or the residue of an aliphatic alcohol of from 1 to 5 carbon atoms and R is H or $CH_3$ While the above examples illustrate the production of only the diethyl or di-n-butyl esters of butadiene- or iso-prenephosphonic acids, the methods therein employed are likewise applicable to the production of other diolefinic phosphonic acid esters in which the alcohol portion of the molecule contains from 1 to 5 carbon atoms. For example, instead of ethanol or butanol as the esterifying agents in Examples 1 and 2, there may be employed methanol, propanol, isopropanol, other butyl alcohols, or any of the three amyl alcohols. Also when employing the methods used in Examples 3 and 4, instead of using triethyl phosphite or sodium diethyl phosphite, there may be used other alkyl phosphites or alkali metal alkyl phosphites where the alkyl group has from 1 to 5 carbon atoms for the production of other esters of 1,3-butadiene-1-phosphonic acids. When preparing the diesters of isoprene-1-phosphonic acid, instead of employing 1,4-dichloro-2-butene as the initial chloro alkene, I use 1,4-dichloro-2-isoprene in the reaction with the trialkyl phosphite or the alkali metal dialkyl phosphite.

Although the above examples show the use of only benzene as the diluent for the reaction of a diolefin with phosphorus pentachloride or of a mixture of hexane and alcohol for the reaction of a dichloro alkene with a trialkyl phosphite or an alkali metal dialkyl phosphite, there may be employed as solvent or diluent for such reactions any inert liquid media which are stable under the reaction conditions, for example, nitrobenzene, nitroethane, toluene, ligroin, etc. The condensations may likewise be effected in the absence of an extraneous diluent, i. e., an excess of one of the components, if it be a liquid, may be used instead.

While I prefer to use refluxing temperatures and ordinary atmospheric pressures for the reactions, when employing the alkyl phosphites as in reaction 1, I may also use lower temperatures. At atmospheric pressures the condensations occur at temperatures which are as low as 20° C. to 50° C., but when such lower temperatures are employed, correspondingly longer reaction times are required. The use of ordinary atmospheric pressures, as herein described, gives good results, but the condensations may be effected either at reduced pressures or at pressures which are above atmospheric. When carrying out reaction 3, the temperature of reaction should be maintained below 200° C.

The above description and examples are intended to be illustrative only and not to limit the scope of the invention. This invention extends to all modifications and variations which fall within the spirit and scope of the appended claims.

What I claim is:

1. 1,3-butadiene-1-phosphonic acid esters of 1 to 5 carbon atom alcohols.
2. Diethyl 1,3-butadiene-1-phosphonate.
3. A composition comprising diolefinic phosphonates having the general formula:

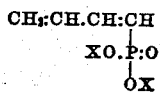

where X is an alkyl group of from 1 to 5 carbon atoms.

4. Polymers of the compounds defined in claim 3.
5. Polymeric diethyl - 1,3 - butadiene - 1 - phosphonate.
6. The process of preparing diethyl-1,3-butadiene-1-phosphonate which comprises heating 1,4-dichloro-2-butene with triethyl phosphite and submitting the resulting reaction mixture to dehydrochlorination.
7. The process defined in claim 6 further characterized in that the dehydrochlorination is effected by treatment with alcoholic KOH.
8. The process of preparing diethyl-1,3-butadiene-1-phosphonate which comprises heating 1,4-dichloro-2-butene with sodium diethyl phosphite, removing the sodium chloride from the reaction mixture, and submitting the resulting residue to dehydrochlorination.
9. The process defined in claim 8 further characterized in that the dehydrochlorination is effected by treatment with alcoholic sodium hydroxide.

GENNADY M. KOSOLAPOFF.